United States Patent
Ushiyama et al.

(10) Patent No.: US 6,612,702 B1
(45) Date of Patent: *Sep. 2, 2003

(54) PROJECTION DISPLAY DEVICE

(75) Inventors: Tomiyoshi Ushiyama, Minowa-machi (JP); Akitaka Yajima, Tatsuno-machi (JP)

(73) Assignee: Seiko Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,689

(22) Filed: Feb. 9, 1999

(30) Foreign Application Priority Data

Feb. 16, 1998 (JP) .......................................... 10-051362

(51) Int. Cl.⁷ ...................... G03B 21/00; G03B 21/14; G02F 1/335; G02B 27/28; G01B 11/26
(52) U.S. Cl. .............................. 353/31; 353/8; 353/20; 353/33; 353/34; 353/37; 349/8; 349/9; 359/501; 356/138; 356/150
(58) Field of Search ................................ 353/31, 20, 8, 353/33, 34, 37; 349/9, 8; 359/501; 356/138, 150

(56) References Cited

U.S. PATENT DOCUMENTS

| | | | | |
|---|---|---|---|---|
| H76 H | * | 7/1986 | Cotterman | |
| 4,917,465 A | * | 4/1990 | Conner et al. | 350/335 |
| 5,117,311 A | * | 5/1992 | Nomura | 359/819 |
| 5,325,218 A | * | 6/1994 | Willett et al. | 359/53 |
| 5,743,610 A | * | 4/1998 | Yajima et al. | 353/31 |
| 5,825,022 A | * | 10/1998 | Takekoshi et al. | 359/485 |
| 5,835,279 A | * | 11/1998 | Marshall et al. | 359/645 |
| 6,144,505 A | * | 11/2000 | Nakanishi et al. | 359/811 |

* cited by examiner

*Primary Examiner*—Russell Adams
*Assistant Examiner*—Khaled Brown
(74) *Attorney, Agent, or Firm*—Oliff & Berridge, PLC

(57) ABSTRACT

The invention accurately sets a polarization direction of a polarization element, and prevents deterioration of the usage efficiency of the light and a reduction in image contrast. Field lenses are provided on a projection display device. A polarizer is placed on a flat surface of a field lens. The flat surface of the field lens is provided with a reference shape to place the polarizer at the end thereof. The reference shape may be one or more planes provided on the end of the field lens. In addition, the reference shape may be a straight line drawn on the flat surface of the field lens.

18 Claims, 6 Drawing Sheets

PROJECTION DISPLAY DEVICE

BACKGROUND OF THE INVENTION

1. Field of Invention

This invention relates to a projection display device which employs liquid crystal light valves as optical modulation devices to modulate illuminated light on the basis of an input image signal.

2. Description of Related Art

Projection display devices, employing liquid crystal light valves as optical modulation devices, have been proposed to project an image onto a projection screen. A liquid crystal light valve is constructed by a liquid crystal panel (liquid crystal cell) sandwiched between an incident-side polarizer and an emitting-side polarizer, which are set so that transmission axes of light are perpendicular to each other. The incident-side polarizer and the emitting-side polarizer are typically provided in the vicinity of an incident surface and an emitting surface of the liquid crystal panel. The liquid crystal light valve modulates polarized light (linearly polarized light) transmitted by the incident-light polarizer in response to a signal provided to the liquid crystal panel, and transmits only modulated light of the polarized light in the direction equal to that of the transmission axis of the emitting-side polarizer, thereby emitting the modulated light responsive to the given image signal.

FIGS. 6(A) and 6(B) each show a function of the polarizer. The drawings are provided with rectangular coordinates in which the direction of travel of light is referred to as the z direction, the horizontal direction is referred to as the x direction and the vertical direction is referred to as the y direction. FIG. 6(A) shows a state in which, when non-polarized light (for example, natural light) including s-polarized light (linearly polarized light of which the vibrating plane is the yz plane) and p-polarized light (linearly polarized light of which the vibration plane is the xz plane) is incident on a polarizer, in which the direction of the polarization axis is referred to as the y direction and the direction of the absorption axis is referred to as the x direction, only the s-polarized light in the direction equal to that of the transmission axis is emitted. That is, the polarizer usually transmits polarized light having a component in the direction equal to that of the transmission axis, and absorbs polarized light having a component in the direction equal to that of the absorption axis that is perpendicular to the transmission axis. Therefore, if the set transmission axis of the polarizer is shifted from the direction of the polarized light that is to be utilized, as shown in FIG. 6(B), the quantity of the polarized light utilized by being transmitted by the polarizer decreases, and the usage efficiency of the light deteriorates.

SUMMARY OF THE INVENTION

This invention solves the above problem of the conventional art devices, and its object is to provide a technique for setting a polarization direction of a polarization element accurately, and for preventing deterioration of usage efficiency of light and a reduction in image contrast.

In order to solve at least a part of the above problem, a first projection display device of the present invention includes:

an illumination optical system that emits illuminating light;

a light valve that modulates the illuminating light emitted from the illumination optical system on the basis of a given image;

a projection optical system that projects the modulated light emitted from the light valve;

a lens provided on a side of an incident surface of the light valve in order to illuminate an effective area of the light valve by utilizing the illuminating light emitted from the illumination optical system; and a polarization element fixed on a flat surface of the lens, wherein the lens is provided with a reference shape which is usable as a reference to position the polarization element.

A second projection display device of the present invention includes:

an illumination optical system that emits illuminating light;

a color light separation section that separates the illuminating light emitting from the illumination optical system into three color light;

three light valves that modulate the three color light on the basis of a given image;

three lenses that are each placed on a side of an incident surface of each of the light valves, in order to illuminate corresponding effective areas of the light valves by the three color light;

three polarization elements placed on a side of emitting surfaces of the three lenses;

a color light synthesizing section that synthesizes the modulated light emitted from the three light valves; and a projection optical system that projects the synthesized light emitted from the color light synthesizing section, wherein at least the polarization elements are fixed to flat surfaces of at least one of the three lenses, and wherein the lenses to which the polarization elements are fixed are provided with a reference shape which is usable as a reference to position the polarization elements.

According to the first and second display devices, since the lenses to which the polarization elements are fixed are provided with a reference shape which is usable as a reference to position the polarization element, the polarization elements can be accurately positioned within the device. In addition, the lenses can be accurately placed. This can increase the usage efficiency of the polarized light emitted from the polarization element. In addition, if the positioning of polarization elements in the device is performed wherein the direction of transmission and the direction of absorption of light of the polarization elements is deviated, it causes a reduction in image contrast. According to the invention discussed above, the reduction in image contrast can be prevented.

In addition, in the second projection display device, a dichroic film may be formed between the flat surface of the lens to which the polarization elements are fixed and the polarization elements.

In this way, if the dichroic film is formed on the flat surface of the lens, a reduction in size of the device can be achieved as compared with a case in which a dichroic film is separately placed in the projection display device.

Additionally, the reference shape may include one or more planes provided on the end of the lens. The reference shape may also be a straight line drawn on the flat surface of the lens. In fact, any reference shape can be employed as long as it can be used as the reference for fixing the polarization elements to the lens.

DETAILED DESCRIPTION OF PREFERRED EMBODIMENTS

Next, the mode for carrying out the present invention will be described on the basis of various embodiments. Incidentally, in the following explanation, unless otherwise specified, the direction in which light travels is referred to as the z direction, the 3 o'clock direction as viewed from the direction in which light travels (z direction) is referred to as the x direction, and the 12 o'clock direction is referred to as the y direction.

Figure 1:
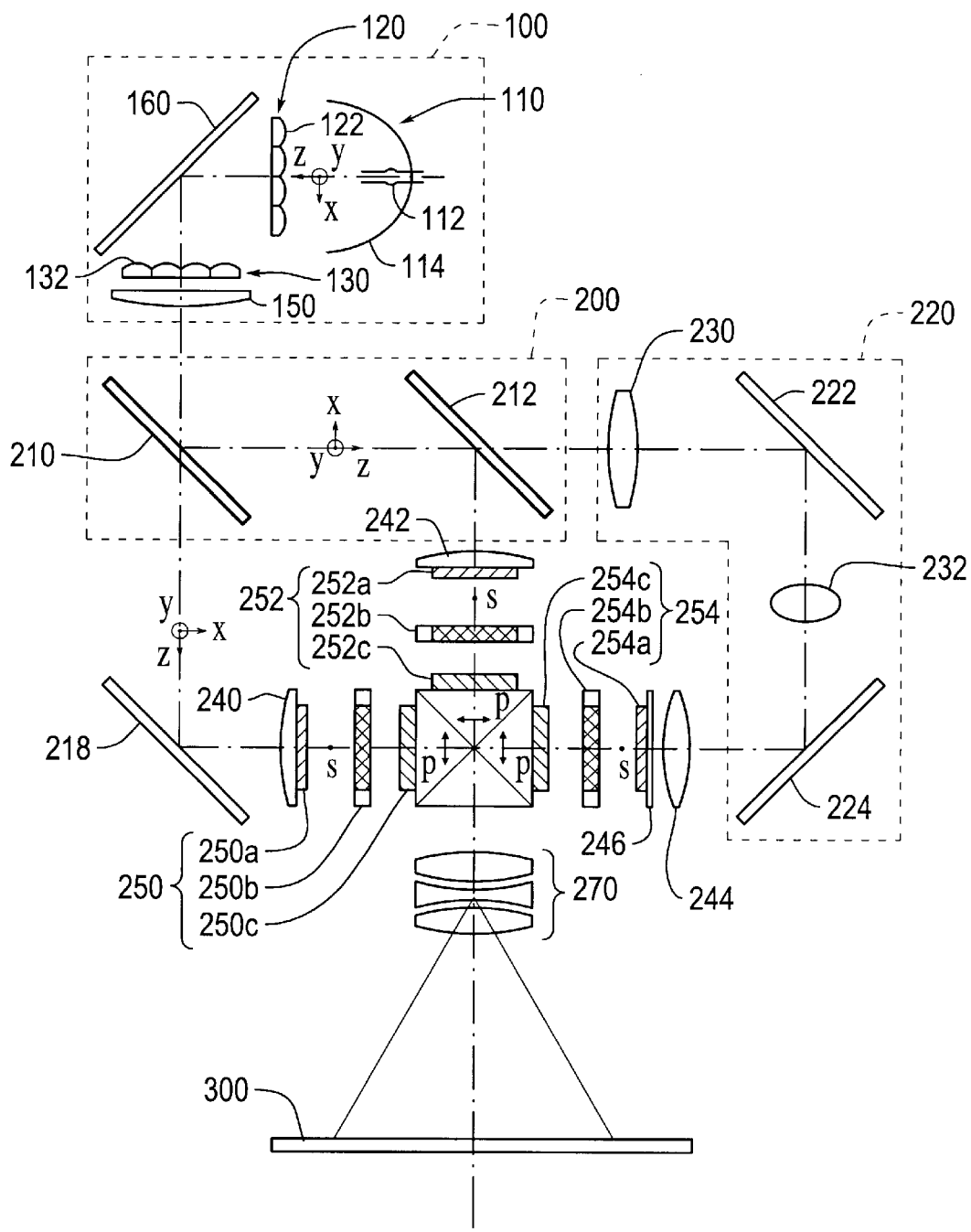
FIG. 1 is a schematic plan view showing a main part of a projection display device of this invention.

FIG. 1 is a schematic plan view showing a main part of a projection display device of this invention. The projection display device comprises an illumination optical system 100, a color light separation optical system 200 including dichroic mirrors 210 and 212, a light guide optical system 220 including reflecting mirrors 222 and 224, an incident-side lens 230 and a relay lens 232, three sheets of field lenses 240, 242, and 244, three sheets of liquid crystal light valves 250, 252, and 254, a cross-dichroic prism 260, and a projection lens system 270. The liquid crystal light valves 250, 252, and 254 comprise liquid crystal panels 250b, 252b and 254b, incident-side polarizers 250a, 252a, and 254a, and emitting-side polarizers 250c, 252c, and 254c, respectively. Each of the liquid crystal panels 250b, 252b and 254b has a construction such that only polarizers are excluded from a normal liquid crystal panel including two sheets of polarizers.

The illumination optical system 100 comprises a light source 110 for emitting a substantially parallel luminous flux, a first lens array 120, a second lens array 130, a superimposing lens 150 and a reflecting mirror 160. The illumination optical system 100 is an integrator optical system for uniformly illuminating effective areas of the liquid crystal panels 250b, 252b and 254b that are illumination areas of the liquid crystal light valves 250, 252, and 254.

The light source 110 has a light source lamp 112 as a radiating light source for emitting radial beams, and a concave mirror 114 for emitting substantially parallel beam flux which has been emitted from the light source lamp 112 as radial light. A halogen lamp, metal halide lamp, and high-pressure mercury lamp are typically used as the light source lamp. A paraboloidal mirror may preferably be employed as the concave mirror 114.

Figure 2:
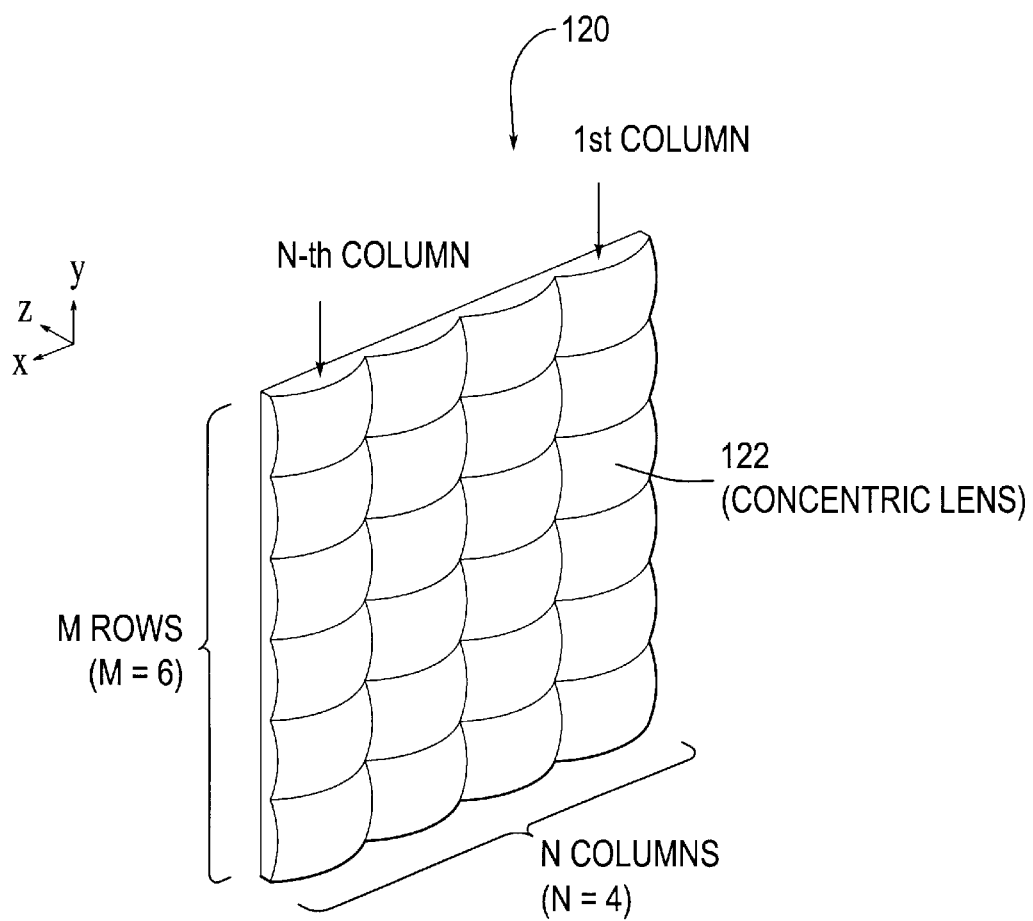
FIG. 2 is a perspective view showing an exterior of a first lens array.

FIG. 2 is a perspective view showing an exterior of the first lens array 120. The first lens array 120 has a construction such that small lenses 122, each having a substantially rectangular periphery, are arranged in the form of a matrix with M rows and N columns. In this embodiment, M=6, and N=4. Each of the small lenses 122 divides the parallel luminous flux incident from the light source 110 (FIG. 1) into a plurality of (i.e., M×N) partial luminous fluxes to form an image thereof in the vicinity of the second lens array 130. The external shape of each of the small lenses 122 as viewed in the z direction is set to be substantially similar to the shape of the liquid crystal panels 250b, 252b, and 254b. For example, if an aspect ratio (the ratio of length to width) of the illumination area of the liquid crystal light valve (the area on which the image is displayed) is 4:3, the aspect ratio of each of the small lenses is set to 4:3.

The second lens array 130 also has a structure such that the small lenses are arranged in the form of a matrix with M rows and N columns so as to correspond to the small lenses 122 of the first lens array 120. The second lens array 130 has a function of adjusting center axes (main beams) of the each partial luminous fluxes emitted from the first lens array 120 so that they are perpendicularly incident on the incident surface of the superimposing lens 150. The superimposing lens 150 has a function of superimposing each of the partial luminous fluxes on the liquid crystal panels 250b, 252b and 254b. In addition, each of the field lenses 240, 242 and 244 has a function of converting partial luminous fluxes emitted from the superimposing lens to be illuminated onto the illumination areas into luminous fluxes parallel to the center axes thereof. While the second lens array 130 and the superimposing lens 150 are constructed separately in the present embodiment, the second lens array 130 may have the function of the superimposing lens 150. For example, each of the small lenses may be formed by a decentering lens. In addition, the second lens array 130 may be omitted when the luminous flux emitted from the light source is excellent in parallelism.

As shown in FIG. 1, the second lens array 130 is inclined by 90 degrees with respect to the first lens array 120 across the reflecting mirror 160. The reflecting mirror 160 is provided to guide the luminous flux emitted from the first lens array 120 to the second lens array 130. According to the construction of the illumination optical system, the reflecting mirror 160 is not essential. For example, if the first lens array 120 and the light source 110 are provided parallel to the second lens array 130, the reflecting mirror 160 is not required.

In the projection display device shown in FIG. 1, the substantially parallel luminous flux emitted from the light source 110 is divided into a plurality of partial luminous fluxes by the first and second lens arrays 120 and 130 which form the integrator optical system. The partial luminous fluxes emitted from the small lenses of the first lens array 120 are collected so that a plurality of light source images (secondary light-source images) of the light source 110 are formed in the vicinity of the small lenses 132 of the second lens array 130. The partial luminous fluxes, which have been emitted from the secondary light source images which formed in the vicinity of the second lens array 130, are superimposed by superposing lens 150, on the effective areas (display areas) of the liquid crystal panels 250b, 252b, and 254b while being diffused. Consequently, the liquid crystal panels 250b, 252b, and 254b are substantially uniformly illuminated.

The color light separation optical system 200 comprises two sheets of dichroic mirrors 210 and 212, and has a function of separating the light emitted from the superimposing lens 150 into three color light of red, green, and blue. The first dichroic mirror 210 transmits a red luminous flux component in a white luminous flux emitted from the illumination optical system 100, and reflects a blue light component and a green light component. The red light transmitted through the first dichroic mirror 210 is reflected from the reflecting mirror 218, and passes through the field lens 240 to reach the red light crystal light valve 250. The field lens 240 converts each of the partial luminous fluxes emitted from the second lens array 130 into luminous fluxes parallel to the center axes (main light beam) thereof. Similar descriptions apply to the field lenses 242 and 244 provided in front of the other liquid crystal light valves 252 and 254.

Out of the blue light and the green light reflected from the first dichroic mirror 210, the green light is reflected by the second dichroic mirror 212, and passes through the field lens 242 to reach the green light liquid crystal light valve 252. On the other hand, the blue light is transmitted through the second dichroic mirror 212, and passes through the relay lens system (light guide optical system) 220 comprising the incident-side lens 230, the relay lens 232 and reflecting mirrors 222 and 224 and further, passes through the emitting-side lens (field lens) 244 to reach the blue light liquid crystal light valve 254. Since the length of the optical path of the blue light is longer than that of other color light, the relay lens system is employed for the blue light in order to prevent deterioration of usage efficiency of light due to diffusion of light or the like, i.e., in order to propagate the partial luminous fluxes incident on the incident-side lens 230 to the emitting-side lens 244 as they are.

The liquid crystal light valve 250 comprises the incident-side polarizer 250a, the liquid crystal panel 250b, and the emitting-side polarizer 250c. The incident-side polarizer 250a has a transmission axis, the direction of which is set to that of the s-polarized light, and transmits only the s-polarized light out of the incident light. The liquid crystal panel 250b modulates the polarization direction of the red polarized light emitted from the incident-side polarizer 250a in accordance with given image information (image signal). The emitting-side polarizer 250c has a transmission axis, the direction of which is set to that of the p-polarized light perpendicular to the direction of the s-polarized light, and transmits only the p-polarized light out of the modulated light emitted from the liquid crystal panel 250b. Accordingly, the liquid crystal light valve 250 has a function of modulating the incident light in accordance with the given image information. When the direction of the transmission axis of the incident-side polarizer 250a is set to that of the p-polarized light, the direction of the transmission axis of the emitting-side polarizer 250c is set to that of the s-polarized light.

The liquid crystal light valves 252 and 254 comprise the incident-side polarizers 252a and 254a, liquid crystal panels 252b and 254b, and the emitting-side polarizers 252c and 252c, respectively, and have a function similar to that of the liquid crystal light valve 250.

The cross-dichroic prism 260 functions as a color light synthesizing section which forms a color image by synthesizing color light of three colors. In the cross-dichroic prism 260, a dielectric multilayer film for reflecting the red light and a dielectric multilayer film for reflecting the blue light are formed on the interfaces of four rectangular prism in substantially an X shape. The color light of three colors are synthesized by these dielectric multilayer films, and synthesized light for projecting a color image is formed. The synthesized light formed in the cross-dichroic prism 260 is emitted in the direction of a projection lens system 270. The projection lens system 270 functions as a projection device which projects the synthesized light onto a projection screen 300 to display the color image.

The above projection display device is characterized by the field lenses 240, 242, and 244, and the liquid crystal light valves 250, 252, and 254.

The liquid crystal light valves 250, 252, and 254 are provided with the incident-side polarizers 250a, 252a, and 254a, and the emitting-side polarizers 250c, 252c, and 254c spaced from the liquid crystal panels 250b, 252b, and 254b, respectively. The incident-side polarizers 250a and 252a are placed on flat emitting surfaces of the field lenses 240 and 242, respectively. The incident-side polarizer 254a is adhered on the emitting surface of a transparent plate (such as a glass plate) 246. In general, the best polarization characteristics of the polarizer can be obtained when the light is perpendicularly incident on the incident surface, and changes with the incident angle. Therefore, if the polarizer is adhered on a curved surface of the field lens 244, the polarization characteristics deteriorate. The emitting-side polarizers 250c, 252c, and 254c are adhered onto the incident surface of the cross-dichroic prism 260.

As described above, by separating the incident-side polarizers 250a, 252a, and 254a and the emitting-side polarizers 250c, 252c, and 254c from the liquid crystal panels 250b, 252b, and 254b, it is possible to suppress a rise in temperature of the liquid crystal panels due to heat loss of the polarizer.

Figures 3A, 3B:
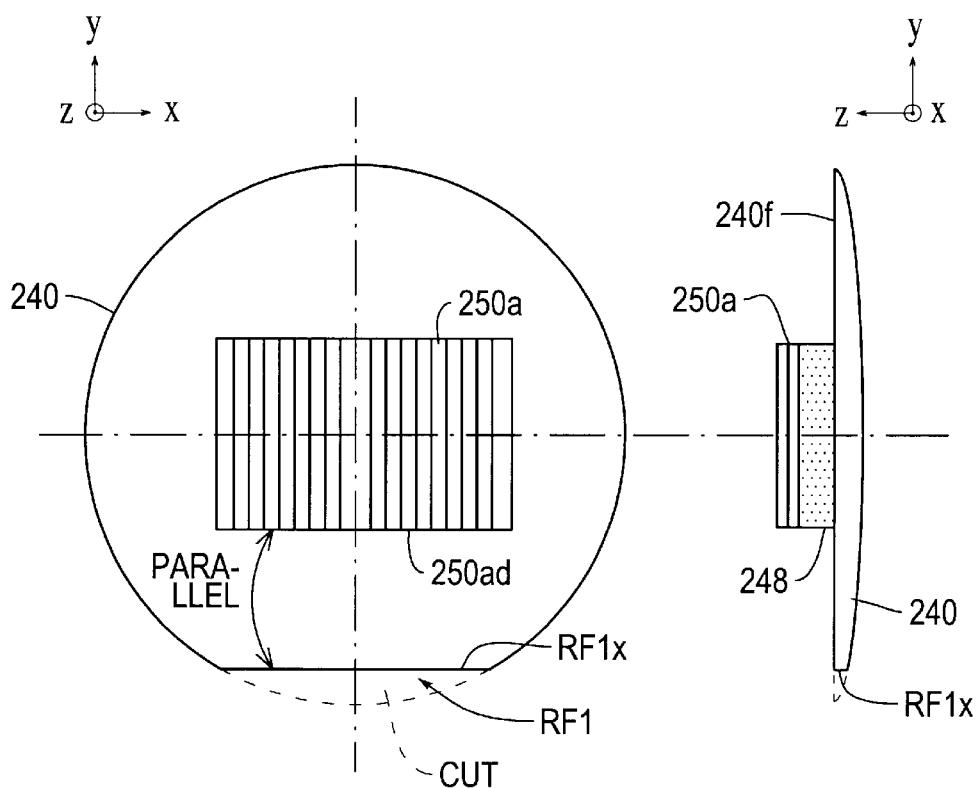
FIGS. 3(A) and 3(B) each show a state in which an incident-side polarizer is placed on a field lens.

FIGS. 3(A) and 3(B) show a state in which the incident-side polarizer 250a is place don the field lens 240. The field lens 240 has a reference surface RF1, the lower edge of which is cut parallel to the x-axis plane. Such a lens can be formed by cutting the lower edge of a normal lens, or by molding the lenses in one piece. The incident-side polarizer 250a is placed on a flat surface 240f of the field lens 240 by adhesive 248 so that the lower edge 250ad thereof is parallel to the reference line RF1x in the x-axis direction of the reference surface RF1. In this case, if the field lens 240 is arranged in such a manner that the reference surface RF1 coincides with the x-axis direction (the horizontal direction) in the projection display device, the field lens can be accurately placed. If the direction of the transmission axis (the direction of a stripe in the drawing) of the incident-side polarizer 250a is set with reference to the lower edge 250ad, the direction of the transmission axis of the polarizer can be accurately set to the direction of the polarized light (linearly polarized light) that is to be transmitted. This can suppress a reduction in the usage efficiency of the light which is caused by the direction of the transmission axis of the polarizer is set being shifted with respect to the polarizer light that is to be transmitted. In addition, if the direction of the transmission axis of the polarizer is set to be shifted with respect to the direction of the polarized light that is to be transmitted, a direction of the absorption axis of the polarizer is also shifted correspondingly with respect to polarized light which is to be absorbed. This allows polarized light in an undesired polarization direction to be incident on the liquid crystal light valve, thereby causing a reduction in contrast of a projected image. According to the above embodiment, such a reduction in contrast can be prevented.

While the placing of the incident-side polarizer 250a on the field lens 240 that has the reference surface RF1 is described above, the polarizer 250a may be placed on the field lens 240 in advance, and thereafter, the field lens 240 may be cut in accordance with the transmission axis of the incident-side polarizer 250a. This also allows the polarizers and the field lenses to be accurately arranged in the projection display device.

Figure 4:
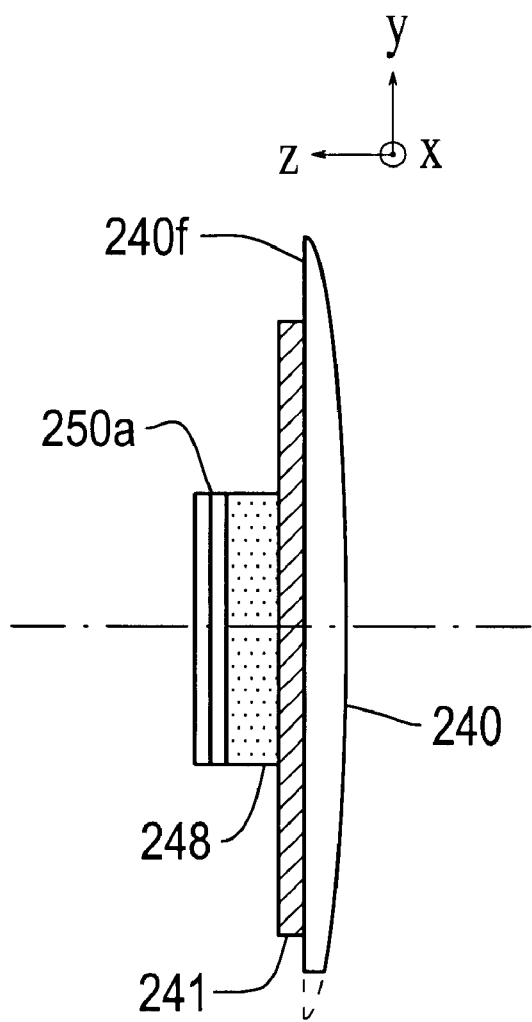
FIG. 4 shows another embodiment of the field lens to which the incident-side polarizer is adhered.

FIG. 4 shows another embodiment of the field lens 240 on which the incident-side polarizer 250a is placed. The light transmitted through the field lens 240 may preferably be complete red light which is separated in the color light separation optical system 200 (FIG. 1). However, it is frequently difficult to completely separate only the red light. Thus, in order to increase the purity of the red light, a red light-transmitting dichroic film 241 is evaporated onto a flat surface 240f of the field lens 240, as shown in FIG. 4. In such a case, the incident-side polarizer 250a is further placed on the dichroic film 241 by the adhesive 248. The dichroic film 241 is normally a multilayer film formed of several tens of dielectric layers. The characteristics of the light emitted from the dichroic film 241 vary between the cases in which a medium on the side of the emitting surface of the dichroic film 241 is air and in which the medium is the adhesive 248, as shown in FIG. 4. Therefore, the characteristics of the dichroic film 241 may preferably be set to suitable characteristics by varying the optical constants of the adhesive 248 and the field lens 240, the construction of the dichroic film, and the optical constants of each of the films and so on.

Figure 5A:
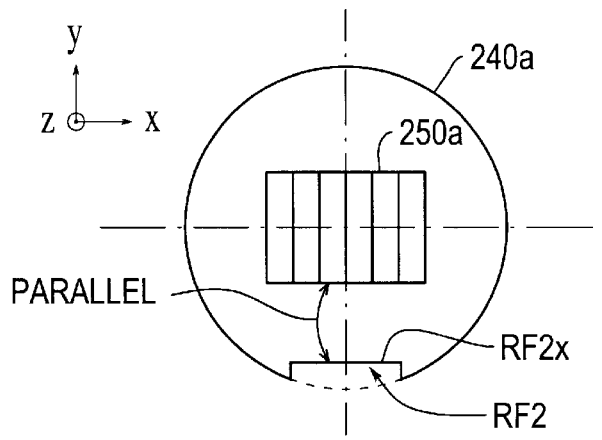
FIGS. 5(A)–5(C) each show a further embodiment of the field lens.
Figure 5B:
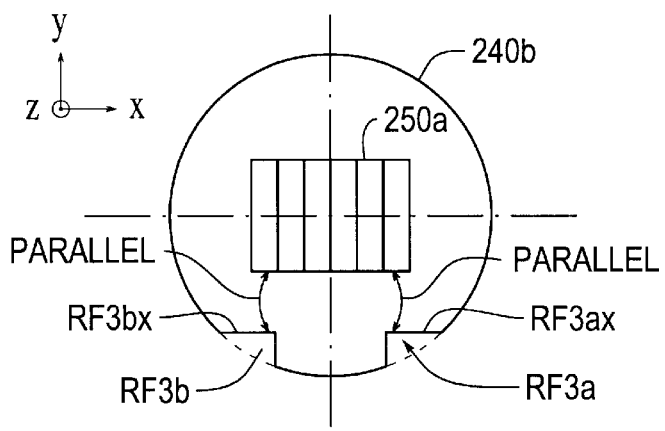
Figure 5C:
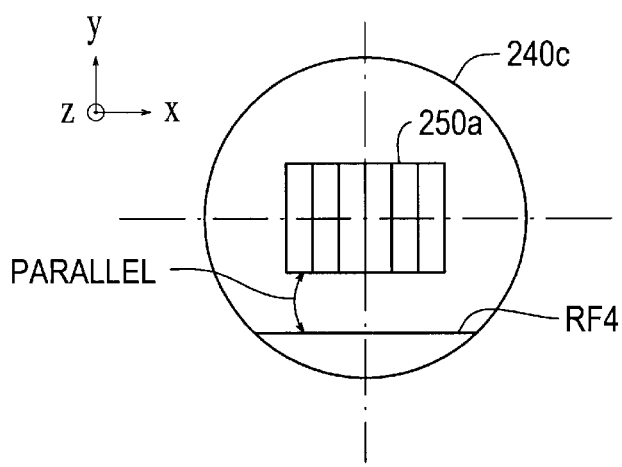
Figure 6A:
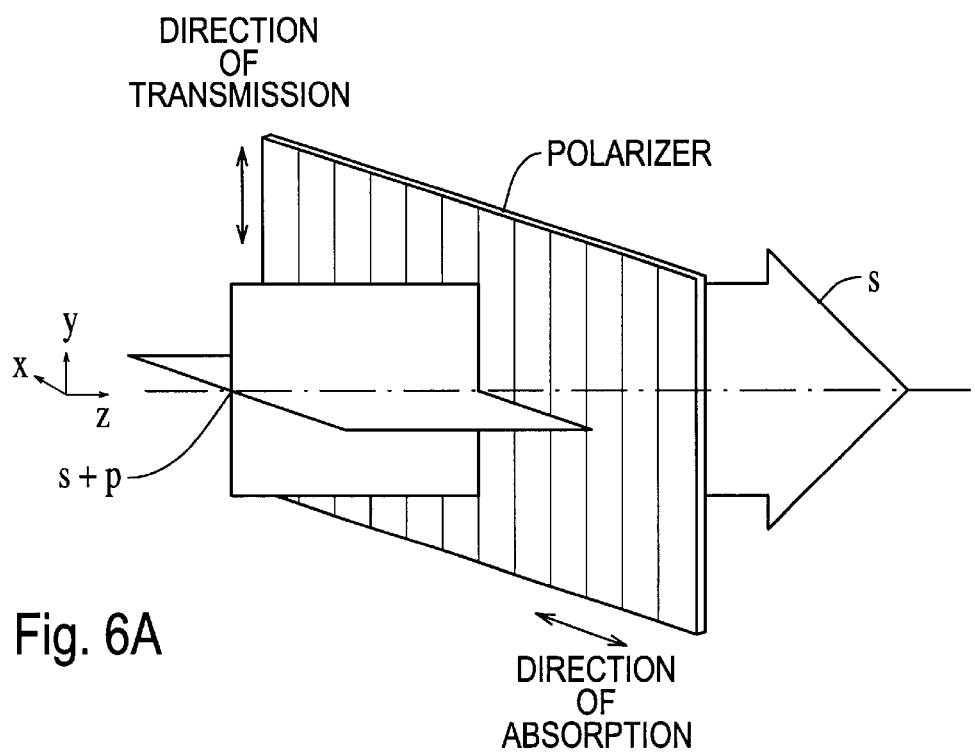
FIGS. 6(A) and 6(B) each show a function of a polarizer.
Figure 6B:
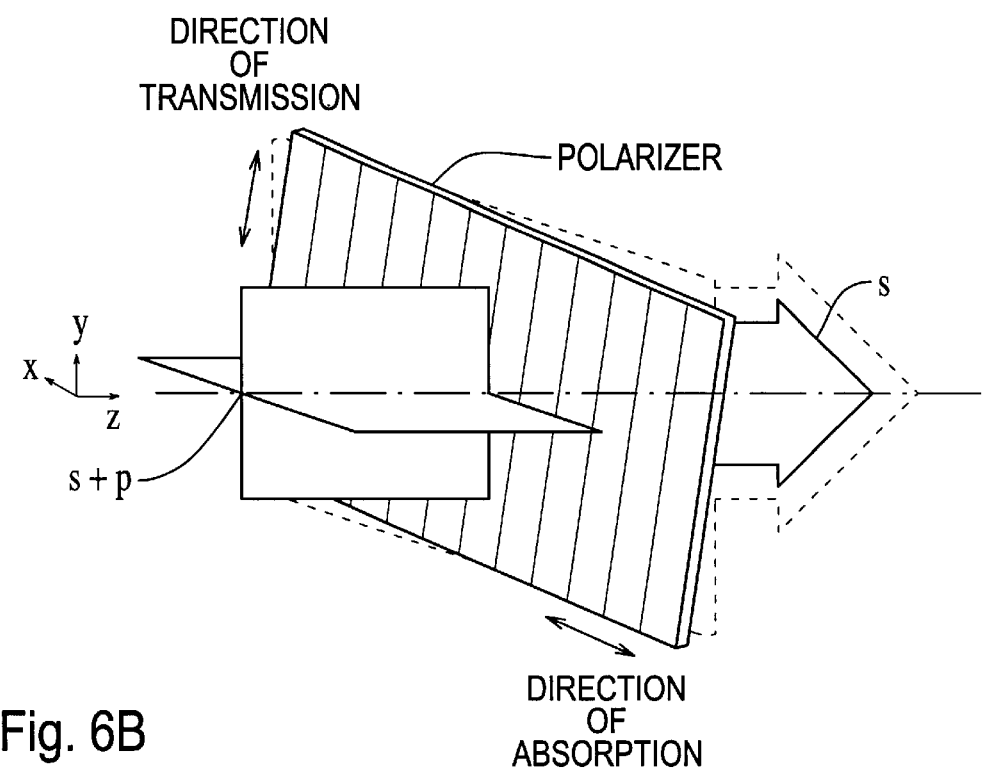

FIGS. 5(A)–5(C) each show a further embodiment of the field lens 240. A field lens 240A shown in FIG. 5(A) is an example in which a part of the lower edge thereof is cut in a rectangular shape to form a reference surface RF2 that has a reference line RF2x which is parallel to the x-axis. A field lens 240B shown in FIG. 5(B) is an example in which parts of the lower edge are cut symmetrically with respect to the center line parallel to the y-axis to form reference surfaces RF3a and RF3b that have reference lines RF3ax and RF3bx which are parallel to the x-axis. Either of the field lens 240A of FIG. 5(A) and the field lens 240B of FIG. 5(B) can be accurately placed in the projection display device similarly to the field lens 240. In addition, since the incident-side polarizer 250a can be accurately placed on the field lens 240A or 240B, the direction of the transmission axis of the polarizer 250a can be accurately set in the direction of polarized light (linearly polarized light) that is to be transmitted.

A field lens 240C shown in FIG. 5(C) is, unlike the field lenses 240A and 240B, an example which a reference line RF4 is drawn on the lower edge. The line may be added to the field lens by scratching or painting, as long as it is marked. Field lens 240C can be accurately placed in the projection display device, similarly to the field lens 240. In addition, since the incident-side polarizer 250a can be accurately placed on the field lens 240A or 240B, the direction of the transmission axis of the polarizer 250a can be accurately set in the direction of polarized light (linearly polarized light) that is to be transmitted. However, since the field lens 240C does not have a flat surface at the lower end thereof, it is difficult to place the field lens 240C by referring to the adjustment of the reference line RF4 and the x-axis, as compared with the other examples.

Since the field lens 242 is similar to the field lens 240, an explanation thereof will be omitted.

In addition, since the surfaces on which the transparent plate 246 and the cross-dichroic piston 260 is placed have a rectangular shape, the incident-side polarizer 254a and emitting-side polarizers 250c, 252c, and 254c can be placed on the surfaces with reference to the lower edge thereof.

The present invention is not limited to the above embodiments and modes for carrying out the invention, and can be carried out in various forms without departing from the spirit and scope thereof. For example, the following modifications may be made.

(1) FIGS. 4 and 5(A)–5(C) show examples of the field lens in the present invention. However, the field lens in accordance with the invention is not limited thereto. Specifically, the field lens only has to have one or more reference lines or reference surfaces for fixing a polarizer to the field lens. Incidentally, a rectangular shaped liquid crystal is normally employed, and the longitudinal direction thereof is set so as to be the lateral direction (the x-axis direction). Therefore, the reference lines or the reference surfaces may preferably be provided in the longitudinal direction of the liquid crystal, that is, on the upper end or the lower end of the field lens.

(2) While a projection display device, which includes three liquid crystal light valves or each of a plurality of color light, synthesizing modulated light emitted from the liquid crystal valves by the cross-dichroic prism as the color light synthesizing section, and displaying color image, has been described in the above embodiments, the field lenses described in the above embodiments may be employed for a projection display device which has just one liquid crystal light valve.

(3) While the field lens on which the incident-side polarizer of the liquid crystal light valve is placed has been described in the above embodiments, the field lens may be effective for a lens used by placing thereon a substance, such as a polarizer or a retardation film, which creates a problem in the relationship between the polarization direction of light and the axial direction.

What is claimed is:

1. A projector, comprising:
   an illumination optical system that emits illuminating light;
   a light valve that modulates the illuminating light emitted from said illumination optical system to emit a modulated light, the light valve having an incident surface,
   a projection optical system that projects the modulated light emitted from the light valve, and
   a lens having a first side, a second side and a peripheral edge, said lens provided on a side of the incident surface of the light valve, when said lens is viewed in a direction along and parallel to an optical axis of said lens at least one part of the peripheral edge of the lens is a straight edge and another part of the peripheral edge of the lens is a curved edge.

2. The projector according to claim 1, wherein the lens has a flat surface and further including a polarization element provided on the flat surface.

3. The projector according to claim 1, wherein the lens has a flat surface and further including a dichroic film provided on the flat surface.

4. A projector according to claim 1, the straight edge being formed so as to provide the periphery edge of the lens with multiple concavities.

5. The projector according to claim 4, wherein the lens has a flat surface and further including a polarization element provided on the flat surface.

6. The projector according to claim 4, wherein the lens has a flat surface and further including a dichroic film provided on the flat surface.

7. A projector according to claim 1, the straight edge being formed so as to provide the periphery edge of the lens with a concavity.

8. The projector according to claim 7, wherein the lens has a flat surface and further including a polarization element provided on the flat surface.

9. The projector according to claim 7, wherein the lens has a flat surface and further including a dichroic film provided on the flat surface.

10. A projector, comprising:
    an illumination optical system that emits illuminating light;

a color light separation section that separates the illuminating light emitted from said illumination optical system into three color light;

three light valves that modulate the three color light to emit a modulated light, each of the light valves having an incident surface, three lenses placed on a side of the incident surface of the light valves, each lens having a first side, a second side and a peripheral edge, respectively, at least one of said three lenses having a shape such that when said at least one lens is viewed in a direction along and parallel to an optical axis of said at least one lens at least one part of the peripheral edge of said at least one lens is a straight edge and another part of the peripheral edge of said at least one lens is a curved edge;

a color light synthesizing section that synthesizes the modulated light emitted from said three light valves to emit a synthesized light; and a projection optical system that projects the synthesized light emitted from the color light synthesizing section.

11. The projector according to claim 10, wherein at least one of the three lens has a flat surface and further including a polarization element provided on the flat surface.

12. The projector according to claim 10, wherein at least one of the three lenses has a flat surface and further including a dichroic film provided on the flat surface.

13. A projector according to claim 10, the straight edge being formed so as to provide the periphery edge of the lens with a concavity.

14. The projector according to claim 13, wherein at least one of the three lenses has a flat surface and further including a polarization element provided on the flat surface.

15. The projector according to claim 13, wherein at least one of the three lenses has a flat surface and further including a dichroic film provided on the flat surface.

16. A projector according to claim 10, the straight edge being formed so as to provide the periphery edge of the lens with multiple concavities.

17. The projector according to claim 16, wherein at least one of the three lenses has a flat surface and further including a polarization element provided on the flat surface.

18. The projector according to claim 16, wherein at least one of the three lenses has a flat surface and further including a dichroic film provided on the flat surface.

* * * * *

UNITED STATES PATENT AND TRADEMARK OFFICE
CERTIFICATE OF CORRECTION

PATENT NO. : 6,612,702 B1
DATED : August 2, 2003
INVENTOR(S) : Tomiyoshi Ushiyama et al.

It is certified that error appears in the above-identified patent and that said Letters Patent is hereby corrected as shown below:

<u>Title page,</u>
Item [73], Assignee, should read as follows:
-- Seiko Epson Corporation Tokyo, Japan --.

Signed and Sealed this

Tenth Day of February, 2004

JON W. DUDAS
*Acting Director of the United States Patent and Trademark Office*